Jan. 3, 1950  G. J. YENTZEN  2,493,472
DUCK CALLER
Filed March 7, 1946
FIG 1
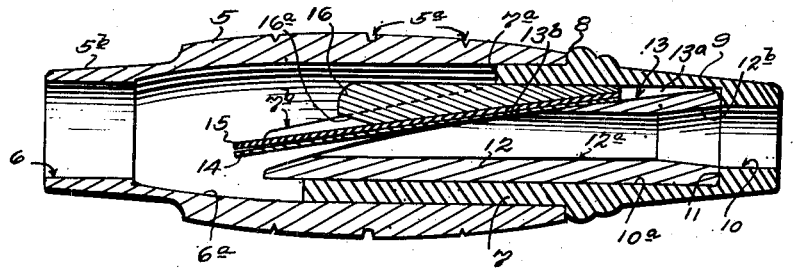
FIG. 2.
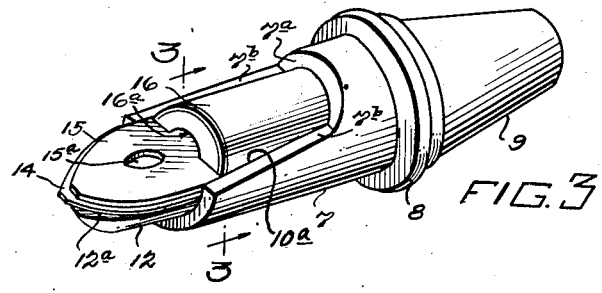
FIG. 3
FIG. 4
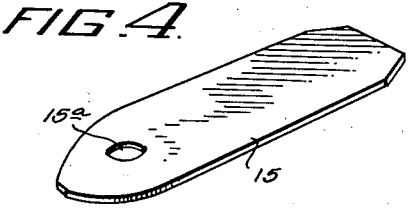
FIG. 5.
Inventor
George J. Yentzen
By Eugene E. Stevens
his Attorney Patented Jan. 3, 1950

2,493,472

UNITED STATES PATENT OFFICE 2,493,472

DUCK CALLER

George J. Yentzen, Nederland, Tex.

Application March 7, 1946, Serial No. 652,635

3 Claims. (Cl. 46—180)

My invention relates to improvements in wind sounding devices, with particular reference to such as are used by hunters for simulating the call of a wild duck or the like.

Briefly and generally stated, the invention has among its primary objects to provide, in a device of this kind, novel means for assuring maintenance of the vibratory sound-emitting tongue against sticking, shifting, and buckling, etc., to the end that a uniform natural sound tone will always be produced.

The invention contemplates a device for the purpose specified which incorporates means for preventing the accumulation of saliva on the sound-emitting vibratory tongue and which means may and preferably does take the form of an expedient for preventing buckling of said vibratory tongue, to the end that the latter may be made thinner and more pliant than otherwise. Obviously an accumulation of saliva on the vibratory tongue would tend to detract from the natural tone emitted by same and would tend to cause said tongue to stick.

Another object of the invention is to provide a duck caller or the like which is very simple in construction, easily assembled, and which lends itself to ready adjustment for the purpose of production of different tones simulating the call of different varieties of wild fowl.

Other objects and advantages of the invention will become apparent as the description proceeds, reference being had to the accompanying drawing which illustrates the now preferred form of the invention.

It is to be understood, of course, that the inventive concept is susceptible of other mechanical expressions within the spirit and scope of the subject matter claimed hereinafter.

In the drawings, wherein the same reference characters have been used to designate the same parts throughout the several views—

Fig. 1 is a longitudinal sectional view through a duck caller or the like embodying my invention;

Fig. 2 is a longitudinal sectional view through the vibratory tongue-confining wedge element which functions as a sound box or amplifier;

Fig. 3 is a perspective view of the device with the mouth piece-providing outer barrel removed;

Fig. 4 is a perspective view of an element which serves to prevent buckling of the vibratory tongue and which also protects the latter against saliva; and Fig. 5 is a cross-sectional view through the device minus the outer barrel or casing, the view having been taken on the line 3—3 of Fig. 3.

Referring to the drawing by reference characters, numeral 5 denotes an outer barrel which is reduced at one end to provide the mouth piece 5b.

As illustrated in Fig. 1, the outer barrel 5 is circumferentially serrated as indicated at 5a, to afford a good grip; and for this same purpose the exterior of the outer barrel 5 is generally cylindrical and curved also in the direction of its length so as to readily fit in the hand of the user.

The outer barrel 5 is shell-like, the mouth piece 5b providing the cylindrical opening 6, which communicates with the longitudinally flared chamber 6a of said outer barrel.

Insertable into the end of the outer barrel 5, remote from the mouth piece 5b, is an inner barrel 7 whose exterior circular wall makes snug contact with the cylindrical chamber 6a of the outer barrel, as indicated in Figs. 1 and 5.

An exterior circumferential shoulder 8 of the inner barrel 7 limits insertion of the inner barrel 7 into the chamber 6a of the outer barrel 5; and from the shoulder 8, the exterior diameter of said inner barrel tapers or is progressively reduced in the direction of its outer end, as indicated at 9.

The sound emitting outer end of the inner barrel 7, has a bore 10, enlarged as at 10a, beginning a short distance inwardly of said outer end, to provide a shoulder 11. The enlarged bore portion 10a, extends to the inner end of said inner barrel 7, and is adapted to receive the sound box 12, whose top portion (Fig. 1) tapers in the direction of mouth piece 5b. Sound box 12 has the central bore or chamber 12a. This latter chamber or bore 12a is preferably flared at its outer end, as indicated at 12b to approximately the diameter of the sound emitting outlet bore 10 of the inner barrel 7 with which it communicates. The outer end of the tapered sound box 12 abuts the shoulder 11 of the inner barrel, as shown, and the flared outer end 12b of the bore 12a acts as an amplifier for the sound, as will be more apparent hereinafter.

The inner barrel 7, inwardly of the shoulder 8 has its top (as viewed in Figs. 1 and 3) cut away as indicated at 7a, to expose the sound box-receiving bore or chamber 10a, and to provide side walls 7b (see Figs. 1 and 3). These side walls 7b taper inwardly across the plane of the axis of the inner barrel 7 (see Figs. 1 and 3). This cut away portion 7a, 7b of the inner barrel 7, provides a space for the sound emitting reed or vibratory tongue 14 which is associated with the tapered sound box 12, which will now be referred to more in detail.

Fig. 1 illustrates the tapered sound box 12 as also having its top (Figs. 1 and 2) lineally cut away on an inwardly extending axis-crossing bias, in the direction of its inner end, as indicated at 13.

The inward bias cut 13 of the tapered sound box 12 exposes the bore 12a of said sound box slightly inwardly of the flared outer portion 12b of said bore (see Figs. 1 and 2) to provide the flattened supporting surface 13a. This surface 13a supports the inner end of a vibratory sound-emitting tongue 14, and a thicker, relatively non-vibratory, juxtaposed strip 15, which is preferably, but not necessarily, coextensive in both width and length to the vibratory tongue 14.

Figs. 1 and 5 show that the vibratory tongue 14, and the strip 15, are held in place against the flattened portion 13a of sound box 12, by means of a wedge 16, whose flattened lower surface makes flat contact with the upper surface of strip 15. The top or outer surface of wedge 16 is rounded to conform to the curve of the bore 10a of the inner barrel 7, as shown in Figs. 3 and 5. Obviously, when the wedge member 12 is forced into the bore 10a of the inner barrel 7, it will maintain the vibratory tongue 14, and the juxtaposed strip 15, securely in place. By preference, the outer end of the wedge 16 is disposed between the sides 7b of inner barrel 7 and has a medial bottom recess 16a opening to the subjacent backing strip 15, so as to provide a bottom finger grip area. This makes wedge 16 easier to handle and manipulate.

Fig. 5 illustrates the sound emitting vibratory strip 14, and its companion backing strip 15, as being slightly less than the width of the sound box 12. Thus, the walls of the latter will not interfere with proper vibration of the sound emitting tongue or strip 14.

The backing strip 15, and tongue 14, preferably extend beyond the end of the sound box 12, as indicated in Figs. 1 and 3. The backing strip 15 has an aperture 15a, so as to admit air into the space between the strips 14 and 15. This prevents an accumulation of saliva on the vibratory sound emitting strip 14, and thus obviates any tendency of the tongue or strip 14 to stick to the strip 15. The strip 15 functions to prevent buckling of the sound emitting strip 14, and also transmits the action of the wedge 16 to the strip 14, which prevents any tendency of the sound emitting strip 14 to shift. By use of the backing strip 15 in association with the tongue or sound emitting strip 14, the latter may be made more flexible and thinner than otherwise would be the case, to the end that a more natural tone can be produced and also to the end that the sound emitting strip or tongue 14 will have a much longer life than otherwise would be the case.

From the foregoing description, taken in connection with the accompanying drawing, it will be apparent that when the user blows into the mouth piece 5b, the sound emitting tongue or strip 14 will be rapidly vibrated to produce the hoarse call of a wild duck or the like.

As viewed in profile (Fig. 1), it will be seen that the strip-engaging shoulders 13b of the sound box 12 at opposite sides of the bore 12a, inwardly (or to the left as viewed in Fig. 1) of the tongue supporting portion 13a, are slightly curved in the direction of the axis of the sound box 12. By reason of this, the strips 14, 15, are clamped against said side shoulders or walls 13b of sound box 12 only for a short distance inwardly (to left as viewed in Fig. 1) of the tongue supporting portion 13a. Thus, air blown in from mouth piece 5b will get under the vibratory tongue 14, which naturally is disposed above the bore 12a of sound box 12 at the inner end thereof. Spacing of the flat shoulders or walls 13b, from the vibratory tongue 14, due to the lineal curve in the direction of the inner end of sound box 12, gives ample space for vibration of the tongue 14 to produce the characteristic fowl call. The backing strip 15 is noted as being of heavier material than the vibratory strip 14, and does not vibrate to any appreciable extent, if at all.

The hole 15a, heretofore mentioned, in the backing strip 15, adjacent the outer end of the latter, permits air as stated to get through to the upper surface of the vibratory tongue 14, so as to keep it dry and prevent accumulation of saliva at such point. Obviously, saliva would tend to cause the tongue 14 to stick to the juxtaposed strip 15 and interfere with proper operation of the vibratory strip 14.

When it is desired to adjust the vibratory tongue 14 and its anti-buckling tongue or strip 15, to change the tone, it is only necessary to remove the outer barrel 5, and by pressure of the thumb on top of the wedge 16, pull same outwardly toward mouth piece 5b to admit of re-adjustment of strip 15 and tongue 14. Then, of course, the wedge 16 is again forced inwardly into the bore 10a of the inner barrel 10.

Having thus described my invention, what I claim is:

1. A duck caller or the like comprising in combination, a main cylindrical hollow barrel, an inner barrel mounted within the main barrel, a sound box mounted within the inner barrel, the sound box and a portion of the inner barrel being cut away on a trans-axis bias inwardly of their outer ends, a vibratory reed mounted on the slanting surface of the sound box, a thin perforated coextensive backing plate overlying said vibratory reed, and a wedge inserted between the backing plate and the overlying uncut-away inner portion of the inner barrel to lock the reed, backing plate and sound box in proper position within the main barrel.

2. A duck caller or the like comprising in combination, an outer barrel-like casing reduced at one end to form a mouthpiece, an inner cylindrical casing insertable within the outer casing and having a portion extending outwardly of the outer casing, a sound box mounted within the inner casing, a portion of the inner casing and the sound box being cut on their transverse axis to provide inwardly slanting supporting surfaces, a vibratory sound-emitting tongue mounted on the slanting supporting surface of the sound box, a thin perforated backing plate mounted coextensively with the tongue pieces, and a tongue and backing plate holding wedge mounted on the backing plate and engaged at one end between the backing plate and the inner barrel to hold the tongue in proper position within the outer casing.

3. A duck caller comprising in combination an outer cylindrical barrel-like casing one end of said casing forming a mouthpiece, an inner cylindrical casing having a longitudinal bore therethrough, the inner casing being removably inserted into the other end of the said barrel-like casing and having a shoulder limiting its insertion thereinto, a sound box mounted within the bore of the inner casing, a portion both of the inner casing and the sound box being cut on an angle to provide a surface slanting toward the mouthpiece end, a vibratory reed resting on the slanting surface of the sound box and having its end extending past the end of the sound box toward the mouthpiece, and a relatively thin backing plate having a recess therein coextensively overlying the vibrating reed, and a wedge engaging the top surface of the backing plate and the inner side of the bore of the inner casing to lock the plate and reed in proper position.

GEORGE J. YENTZEN.

REFERENCES CITED

The following references are of record in the file of this patent:

UNITED STATES PATENTS

| Number | Name | Date |
|---|---|---|
| 726,277 | Fuller | Apr. 28, 1903 |
| 742,680 | Kuhlemeier | Oct. 27, 1903 |
| 795,493 | Ditto | July 25, 1905 |
| 877,715 | Heyman | Jan. 28, 1908 |
| 2,396,359 | Yager | Mar. 12, 1946 |